United States Patent [19]

Dietz et al.

[11] Patent Number: 4,943,124
[45] Date of Patent: Jul. 24, 1990

[54] ASHTRAY FOR VEHICLES

[75] Inventors: Günter Dietz; Volker Dabringhaus; Peter Wegel, all of Wuppertal, Fed. Rep. of Germany

[73] Assignee: Gebr. Happich GmbH, Fed. Rep. of Germany

[21] Appl. No.: 388,015

[22] Filed: Jul. 31, 1989

[30] Foreign Application Priority Data

Jul. 29, 1988 [DE] Fed. Rep. of Germany ....... 3825828

[51] Int. Cl.$^5$ .................................................. E05C 7/06
[52] U.S. Cl. ....................................... 312/222; 292/170
[58] Field of Search ............... 312/348, 222, 15, 18; 292/140, 169, 170

[56] References Cited

U.S. PATENT DOCUMENTS

| | | | |
|---|---|---|---|
| 2,885,251 | 5/1959 | Howard | 312/222 |
| 2,960,858 | 11/1960 | Webster | 292/170 |
| 3,121,319 | 2/1964 | Webster | 292/170 |
| 4,040,652 | 8/1977 | Arfelt et al. | 292/170 |
| 4,462,630 | 7/1984 | Omata | 49/379 |
| 4,525,012 | 6/1985 | Dunner | 312/222 |

FOREIGN PATENT DOCUMENTS

| | | |
|---|---|---|
| 0053593B1 | 11/1981 | European Pat. Off. . |
| 7805800 | 7/1978 | Fed. Rep. of Germany . |
| 2917806A1 | 11/1980 | Fed. Rep. of Germany . |
| 36148041A1 | 11/1987 | Fed. Rep. of Germany . |

OTHER PUBLICATIONS

JP 61 46728 A. In: Patents Abstracts of Japan, M-499, Jul. 17, 1986, vol. 10, 204.
JP 61 46729 A. In: Patents Abstracts of Japan, M-499, Jul. 17, 1986, vol. 10, No. 204.

*Primary Examiner*—Kenneth J. Dorner
*Assistant Examiner*—Gerald Anderson
*Attorney, Agent, or Firm*—Ostrolenk, Faber, Gerb & Soffen

[57] ABSTRACT

A drawer for being held in and removable from a housing, particularly an ashtray in a housing, and including an unlocking mechanism normally in engagement with a stop in the housing and unlockable to enable removal of the drawer from the housing. A slide supported outside and below the container is movable toward the rear of the container. The end of the slide is V-shaped, and the underside of one leg of the V engages an upright bolt for moving the bolt down as the slide is moved rearward, which moves the bolt out of position to abut the housing stop. A push element is engaged by the upper side of the slide for being pushed up to press a spring up inside a recess in the bolt as the slide is pushed in. The slide, bolt and push element having cooperating oblique surfaces for accomplishing the respective pushing. In one embodiment, a push button acts directly on the slide. In another embodiment, a push button acts on the bolt through an intermediate rocker, instead of a slide. The push button and bolt are articulated to the rocker.

16 Claims, 4 Drawing Sheets

ASHTRAY FOR VEHICLES

BACKGROUND OF THE INVENTION

The present invention relates to a container, and particularly an ashtray, e.g. for use in a vehicle, and which is in the form of a drawer ashtray in a housing. The container has a bottom, two sides, a front wall, and a rear wall. The container has an unlocking mechanism which can overcome a stop on the housing to permit the container to be pulled completely out of the housing.

For containers which are in the form of drawers in housings, stops are usually provided. The stops are intended to prevent the ashtray from being unintentionally pulled completely out of the housings. The actions of the stops can be intentionally overcome. Ashtrays for vehicles, for instance, customarily have a pullout prevention, in the form of a multiply bent leaf spring, which acts against a housing stop. See German No. GM 7,805,800. These are disadvantageous in that to unlock the ashtray, the leaf spring must be pushed together inside the housing, which can easily dirty the user's fingers. The only known ashtrays with unintentional opening preventers and automatic opening mechanisms are tilting ashtrays, as shown in U.S. Pat. No. 4,462,630, and these are very complicated.

SUMMARY OF THE INVENTION

It is an object of the present invention to provide a container, and particularly an ashtray, for vehicles, which has an unlocking mechanism which can be operated in a manner which avoids dirtied fingers and rattling noises, while providing particularly user-friendly, easy unlocking by elimination of unlocking elements which extend in an awkward or disturbing manner into the container.

The unlocking or release mechanism in a first embodiment of the invention comprises a slide mounted on the outside of the container or ashtray and movable back and forth, a bolt mounted on the ashtray, a compression mechanism or push element positioned in a recess in the bolt, and resilient means that are also positioned in that same recess and force the compression mechanism perpendicularly against the slide. One end of the slide has a V-shaped structure that extends across its longitudinal axis, creating two surfaces that slope toward each other. The first surface operates in conjunction with a matching sloping surface on the bolt. The second surface cooperates with a matching sloping surface on the compression mechanism. Activating the slide releases the bolt from a withdrawal prevention stop in the housing and simultaneously moves the compression mechanism in the opposite direction. It is advantageous in this embodiment for each sloping surface to slope at an angle of 45° from the direction in which the slide moves.

The housing in which the ashtray is disposed includes at least one stop, e.g. one that is positioned to prevent complete removal of the drawer from the housing. The housing may have two of those stops, one placed to prevent complete withdrawal and one placed further rearward to control the start of withdrawing movement.

In the first embodiment of the invention, the unlocking mechanism slide is accessible from the front side of the container and is movable rearwardly and forwardly as needed for unlocking and locking. The slide is preferably guided on the outside of the container and is of approximately rectangular cross-section. The bolt is guided on the container for moving across or transversely of the slide, e.g. up and down. The resilient means comprises a compression spring disposed in the recess in the bolt and it urges the compression mechanism or push element in the bolt recess perpendicularly against the slide. One end of the slide is of V-shape transverse to its longitudinal direction. This defines a first oblique surface below one leg of the V and a second oblique surface directed away from the first surface and above the other leg of the V. The first oblique surface cooperates with a corresponding oblique surface on the bolt. The second oblique surface cooperates with a corresponding oblique surface of the push element. Upon actuation of the slide, e.g. by pushing it inward or rearward of the tray, the bolt is moved down and unlocking of the bolt from the housing stop occurs. At the same time, the push element is moved opposite the direction of motion of the bolt by the other leg of the V to urge return motion of the bolt. It is advantageous for each of the oblique surfaces to have an angle of inclination of 45°.

The invention makes it possible to produce the unlocking mechanism in a simple and economical manner. It assures easy unlocking which permits release of the container or ashtray from its nonuse to its use conditions and permits complete removal of the container out of the housing without the operator soiling his fingers. It makes free access to the ashtray or container possible since no parts of the unlocking mechanism need extend into the interior of the container. The unlocking mechanism is furthermore designed so that freedom from chattering as well as easy insertion of the container into a housing are assured.

Easy insertion and removal of the container from the housing results from the design of the resilient means, which is preferably in the form of a compression spring of soft spring characteristic, and a helical spring, for example, can be used so that the bolt can overcome the housing stop relatively easy.

It is advantageous for the bolt to be arranged in a non-losable manner on the container and for the bolt to include a projection that rests against the stop on the housing in order to limit its path of movement. It is also advantageous for the bolt to have a run-on or lead in bevel at its end, which cooperates with the housing stop.

In a further development of the invention, the push element has a wedge shape at one end, which corresponds to the V-shaped development of the V-shaped end region of the slide. In order to make the operation easier and to improve the appearance, the free other end of the slide can be developed as a push button.

In a preferred embodiment of the invention, the slide is located on the outside of the bottom plate of the container, the push button is located at the front plate of the container, and the bolt is on the outside of the rear wall of the container.

The slide, the bolt and the compression mechanism or push element are preferably developed as plastic parts and are preferably injection molded. It is advisable to use plastic materials which have low sliding friction properties.

The release mechanism in a second embodiment of the invention has a motion transmission means in the form of a rocker between the bolt and the push button. The rocker is mounted approximately at the midpoint between its ends on the outside of and at the bottom of the container or ashtray. One end of the rocker is articulated to the bolt. The other end of the rocker is articulated to the push button such that the bolt will always move straight toward the push button and/or generally parallel to it. The rocker pivots on the ashtray while the bolt and the push button pivot on the rocker. It is accordingly possible during the manufacturing process to mount the bolt and the push button on the rocker and to thereafter secure the resulting subassembly to the ashtray.

Pins can be shaped onto or formed on the outsides of the free ends of the rocker. These can be snapped into slots in the bolt and in the push button to create a pivoting articulation. This measure facilitates rapid and simple assembly of the parts.

It is practical for the ashtray to have guides for the bolt and push button. The push button in this embodiment can snap into its guide on the ashtray against the force of a restoring spring that is mounted on the other end of the ashtray and which continuously acts on the push button. The push button can rest on snap-in projections and against the edges of a recess in the guide and can move against the force of the restoring spring, whereby the thrust of the push button can be transmitted directly to the bolt by way of the rocker in conjunction with the releasing procedure.

It is preferable for the rocker, the bolt, and the push button of this embodiment to be made from plastic as in the first embodiment.

Other objects and features of the invention are explained in detail below with reference to embodiments shown in the drawings.

DESCRIPTION OF THE PREFERRED EMBODIMENT

Figure 1:
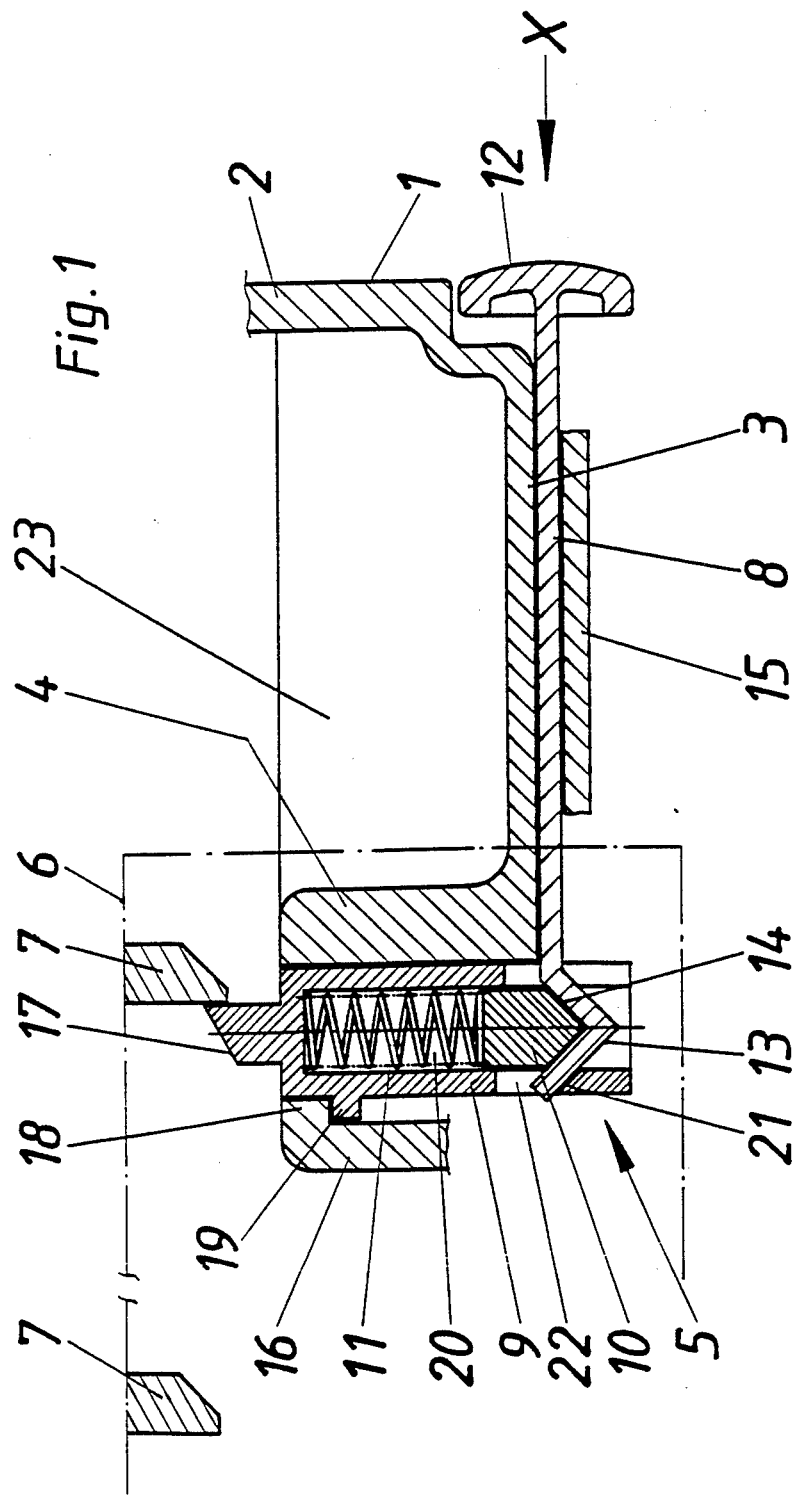
FIG. 1 is a longitudinal section through a container developed as an ashtray for a vehicle, wherein only parts essential in connection with the present invention are shown.

The container, and particularly the ashtray assembly, of the embodiment of the invention of FIG. 1 includes an ashtray 1 which comprises a front wall 2, a bottom wall 3, a rear wall 4 and an unlocking or release mechanism 5. A housing 6, indicated in dash-dot line, receives the ashtray 1 in the manner of a drawer. Two longitudinally spaced apart housing stops 7 are shown in solid line.

The unlocking mechanism 5 comprises four parts, namely a horizontally movable slide 8, a vertical bolt 9, a compression mechanism or push element 10 biased down beneath the bolt and a compression spring 11 normally biasing the push element down.

At the front end of the slide 8 there is a push button 12. At the other rear end region of the slide, there is a V-shaped development projecting transversely to the longitudinal axis of the slide, which creates a first active oblique surface 13 at the bottom of the slide on one leg of the V and, directed away from a second active oblique surface 14 located at the top of the slide on the other leg of the V. The slide 8 is guided for straight line reciprocating movement back and forth in a channel defined between the bottom wall 3 of the tray and a guide 15 fastened to the wall 3 beneath the slide.

The bolt 9 is movable back and forth along with the ashtray 1 because the bolt is supported behind the rear wall 4. The bolt 9 is also guided to move up and down along a path perpendicular to the slide 8 by and between the rear wall 4 of the ashtray and a guide 16 supported by and behind the rear wall 4 in a manner enabling the bolt to move up and down, but fixed against rotation and tilting. The bolt 9 has at its top end a rearwardly directed, run-on bevel 17, which serves to easily overcome the housing stop 7 upon resinsertion of the ashtray in the housing. Toward its other bottom end, the bolt 9 has a perforation or opening through it the bottom of which is formed with an oblique surface 21, which corresponds to and engages the first oblique surface 13 under one leg of the slide 8. The surfaces 13 and 2 are shown at corresponding 45° angles although other cooperating angles may be employed.

The bolt 9 furthermore has a central axial recess 20 which is developed as a blind hole closed at its top inside and which receives a compression spring 11, preferably a helical spring, and then receives the compression mechanism or push element 10 below the spring. Finally, the bolt 9 carries a radial projection 19 which comes to rest beneath a stop 18 of the guide 16 to define the upper limit of upward motion of the bolt.

The push element 10 includes a support surface at its upper end for the lower end of the compression spring 11, and the upper end of the spring 11 rests against the top, inner surface of the recess 20 in the bolt. The compression spring 11 is always under a certain slight initial tension so that the entire locking and unlocking system is kept free of chattering.

At its lower end, the push element 10 has a wedge or V-shape corresponding to and fitting into the V-shaped notch at the one end of the slide. Thus, the push element has an oblique surface which corresponds to the oblique surface 14 of the slide 8. Both surfaces are shown at a corresponding 45° angle although other angles may be selected.

The unlocking or release mechanism 5 is operated in the following way. When the push button 12 is activated in the direction of the arrow X (by pushing it, for instance, with a thumb), the slide 8 is moved inward in the direction of the arrow X, to the left. The oblique surface 13 of the slide 8 then acts on the oblique surface 21 of the bolt 9 which pulls the bolt 9 downward and away from the housing stop 7 and the compression spring 11 is further compressed. The movement of the slide 8 in the direction of the arrow X simultaneously pulls down the bolt 9 due to the first surface 13, and via the second oblique surface 14 of the slide and of the oblique surface of the push element 10 corresponding thereto, it pushes the element 10 upward within the recess 20, whereby the compression spring 11 is further compressed. Releasing the push button 12 permits the tensioned compressed spring 11 to produce reverse courses of movement via the engaging oblique surfaces which correspond to each other and which are all at an angle of 45° relative to the direction of movement of the slide. It is essential that the compression spring 11 always be subject to a certain amount of tension for the overall locking and release system to operate without clattering.

In the invention, the housing 6 may have only the stop 7 illustrated on the left in FIG. 1, only the stop 7 illustrated on the right, or both stops. The first stop 7 at the left holds the ashtray closed and in conjunction with the release mechanism 5, that stop allows the ashtray 1 to move open to start its withdrawal from the housing. The second stop 7 at the right allows the ashtray to be completely removed from its housing. Both stops 7 together allow the ashtray both to be opened and to be removed.

The opening motion of the ashtray 1 may be assisted by a spring or a similar mechanism secured to housing 6, while too abrupt opening can be prevented with a brake.

Figure 2:
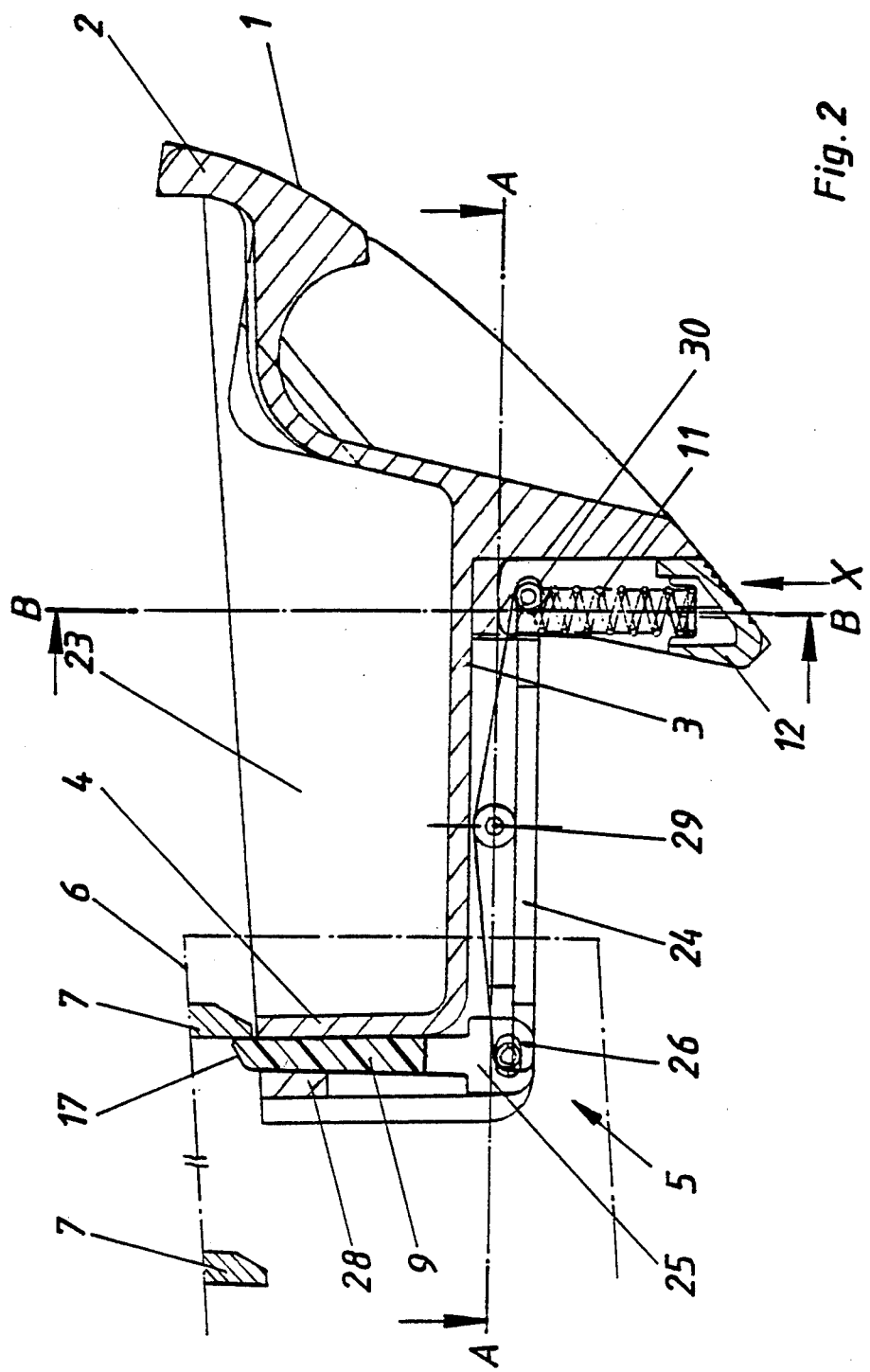
FIG. 2 is a longitudinal section through a second embodiment of such a container.
Figure 3:
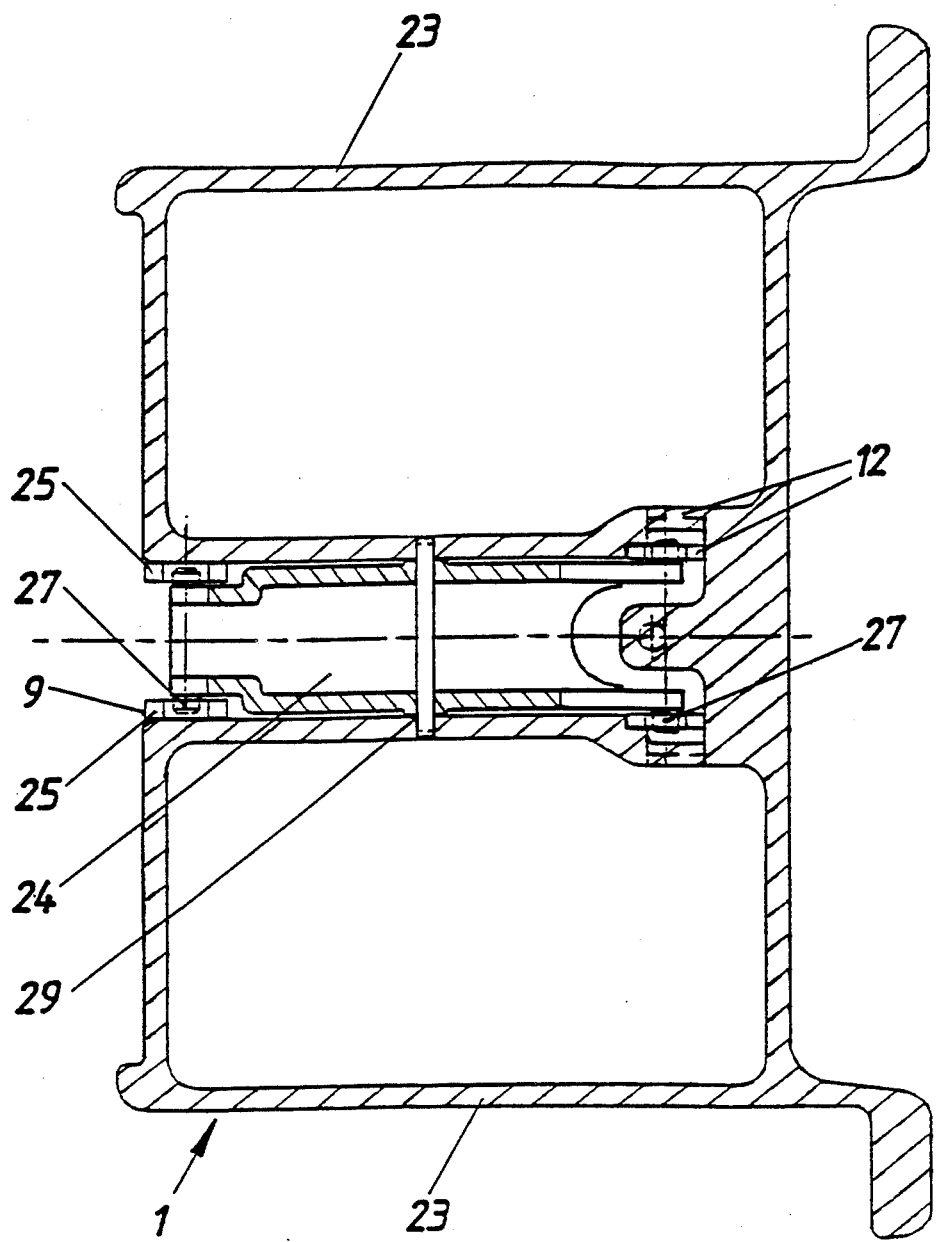
FIG. 3 is a section along the line A—A in FIG. 2.
Figure 4:
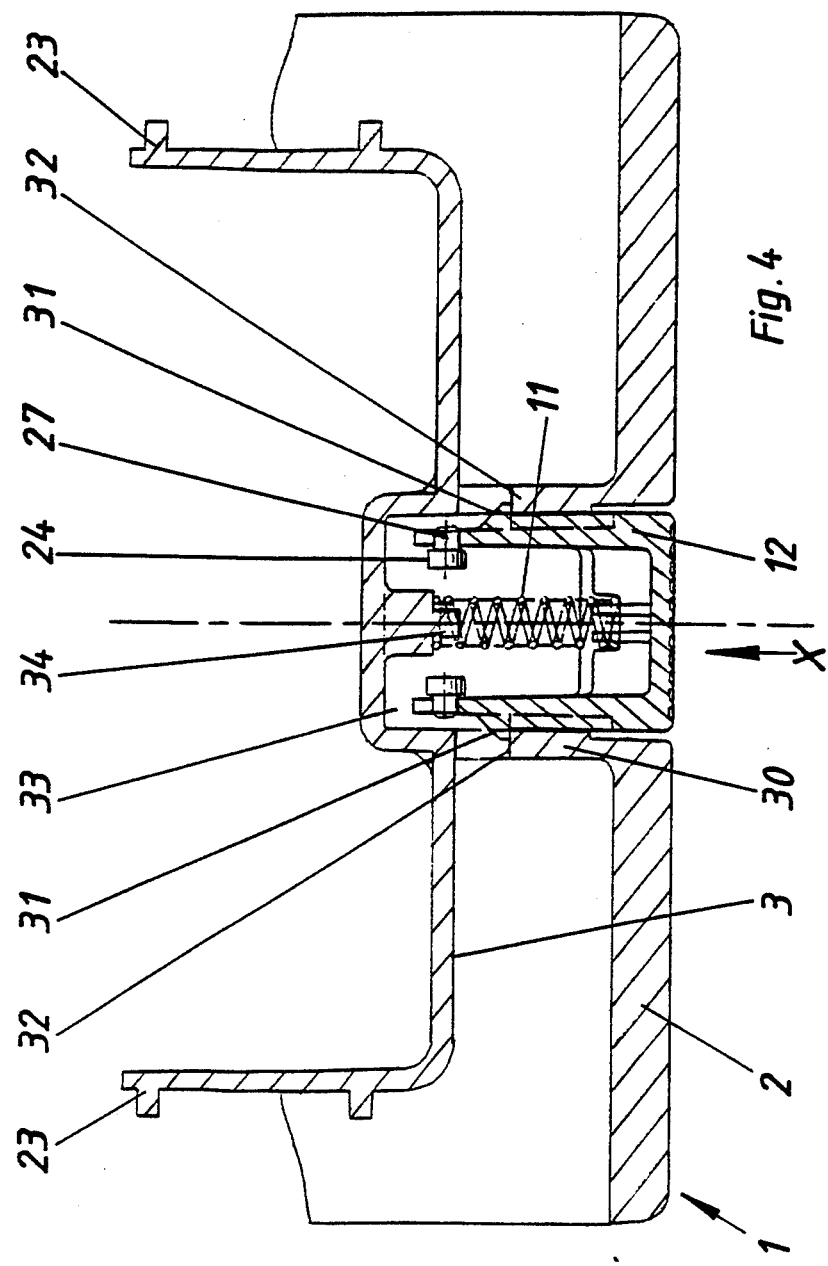
FIG. 4 is a section along the line B—B in FIG. 2.

FIGS. 2 through 4 illustrate a container for an ashtray that differs from the first embodiment illustrated in FIG. 1. Similar parts to those in FIG. 1 are labeled with the same reference numbers.

The ashtray or container illustrated in FIGS. 2 through 4 also comprises a drawer, useful in the form of an ashtray 1 with a front wall 2, a bottom wall 3, a rear wall 4, and sides 23, a release mechanism 5, and a housing 6 represented by dash-dots lines that accommodates the ashtray like a drawer, and has the two stops 7 which are represented by continuous lines.

Release mechanism 5 is again generally in four parts, but they are located differently than in FIG. 1. Specifically, there are a bolt 9 located as in the first embodiment, a push button 12 located toward the front of and beneath the ashtray and vertically movable due to a compression spring 11 pressing against the button, and a transmission in the form of a rocker 24 between the bolt 9 and the push button 12 that moves the bolt 9 away from the stop 7 on the housing 6 against the force of compression spring 11.

The upper end of the bolt 9 has a lead-in slope or bevel 17 that facilitates the introduction of the ashtray 1 into the housing 6. The other bottom end of the bolt is forked. The ends of the fork prongs 25 have slots 26, and pins 27 on rocker 24 snap into those slots. There is a guide 28 for bolt 9 on the ashtray 1. The bolt travels back and forth or up and down between the guide and the rear wall 4 of the ashtray.

Rocker 24 pivots around its midpoint on a pin 29 supported on ashtray 1. In the vicinity of its pivot, the rocker 24 has a U-shaped cross-section, and the pin 29 extends through the opposite legs of the U. Shaped onto the outside of both opposite ends of rocker 24 are additional pins 27 that snap into the slots 26 in the bolt 9 and into similar slots in the push button 12. The whole subassembly can simply be snapped together.

The push button 12 is accommodated on the rocker 24 and introduced into a guide 30 on ashtray 1. As shown in FIG. 4 in particular, part of the push button has a U-shaped cross-section. The legs of the U have snap-in projections 31 that rest on the edges 32 of a recess in the guide 30. Since push button 12, and hence the release mechanism 5 as a whole, are subject to the bias of the compression spring 11 or of other resilient means, projections 31 normally rest against the edges 32. When push button 12 is pushed up or in the direction indicated by arrow X, however, projections 31 are lifted off edges 32. This allows the rocker 24 to tilt and allows the bolt 9 to be forced away from the stop 7 on housing 6.

As will be evident from FIG. 2 and especially from FIG. 4, the bottom 3 of the ashtray 1 is shaped to define a groove 33 that accommodates the rocker 24 and its articulations. In the vicinity of the push button 12, a pin 34 that is surrounded by one end of the compression spring 11 is shaped into the groove 33. A pin that accommodates the other end of the compression spring 11 is shaped onto the push button 12.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A container in the form of a drawer with an unlocking mechanism, comprising:

a housing having a front opening for receiving a drawer, and a drawer movable into and out of the front opening in the housing;

the drawer having a front wall facing out of the housing and having a rear wall spaced from the front wall and further in the housing, and the drawer having a bottom joining the front and rear walls thereof;

a stop in the housing extending in the housing toward the drawer;

an unlocking mechanism supported by the drawer operated in cooperation with the stop to prevent withdrawal of the drawer from the housing beyond a predetermined extent determined by the location of the stop and the unlocking mechanism being operable to permit withdrawal of the drawer from the housing beyond the predetermined extent; the unlocking mechanism comprising:

a slide supported by the drawer, the slide including a bolt operating portion extending rearwardly of the drawer, the slide being moveable forwardly and rearwardly with respect to the drawer and the housing;

a bolt supported on the drawer and being movable in a first direction into engagement with the stop on the housing and being movable in an opposite second direction out of engagement with the stop on the housing; a push element connected with the bolt and movable into and out of engagement with the bolt operating portion of the slide; spring means between the push element and the bolt for urging the push element against the bolt operating portion of the slide, and the bolt and push element being so shaped and positioned that the push element presses upon the bolt operating portion of the slide at one side of the slide, while the bolt engages the bolt operating portion of the slide from the opposite side of the slide;

where the bolt engages the bolt operating portion of the slide, and where the push element, engages the bolt operating portion of the slide, being respectively so shaped that upon movement of the slide in one direction with respect to the drawer, the cooperation between the slide and the bolt moves the bolt in the one direction out of position to abut the housing stop while the slide engages the push element to push the push element in the opposite direction and further biases the spring means to urge the bolt toward the position where it would normally abut the housing stop.

2. The container with unlocking mechanism of claim 1, wherein the drawer is in the form of an ashtray for installation in the housing.

3. The container with unlocking mechanism of claim 1, wherein the bolt is shaped to define a surface that presses upwardly upon the bottom of the bolt operating portion of the slide and the push element includes a bottom end which presses down upon the top of the slide, and the bolt continues and extends upwardly above the slide sufficiently to abut the housing stop.

4. The container with unlocking mechanism of claim 3, wherein the bolt has a recess therein; the push element is disposed within the recess of the bolt; the spring means is disposed in the recess between the push element and the inside of the spring in the bolt.

5. The container with unlocking mechanism of claim 3, further comprising a bolt stop on the bolt and a cooperating projection at the drawer and the bolt stop engages the drawer projection under the bias of the spring means for controlling the height to which the bolt is raised by the spring means.

6. The container with unlocking mechanism of claim 3, wherein the housing stop has a run on bevel on the surface thereof facing outwardly and the bolt has a run on bevel on the surface thereof facing inwardly of the housing, the run on bevels cooperating upon their engagement when the drawer is insrted in the housing for moving the bolt in the first direction out of the way of the housing stop permitting the bolt to pass the housing stop upon insertion of the drawer in the housing.

7. The container with unlocking mechanism of claim 3, wherein the slide, the bolt and the push element all comprise plastic injection molded parts.

8. The container with unlocking mechanism of claim 3, wherein the slide includes a push button at the end thereof for pushing upon the slide for moving the slide toward the rear of the drawer and into the housing for causing the bolt to move in the first direction out of the position for abutting the housing stop.

9. The container with unlocking mechanism of claim 8, wherein the drawer includes a bottom plate meeting the front wall, the slide being located outside the drawer bottom plate, the push button of the slide being located generally at the front wall of the drawer, and the drawer having a rear wall meeting the bottom plate and generally at which the bolt is located.

10. The container with unlocking mechanism of claim 3, wherein the bottom of the bolt operating portion of the slide has a first inclined surface and the bolt surface has a cooperating second inclined surface, and the first and second surfaces are in engagement such that as the slide is moved in one direction, the first surface on the slide cooperates with the second surface on the bolt for moving the bolt in the first unlocking direction away from abutting the housing stop;

the top of the slide having a third inclined surface and the push element having a cooperating fourth inclined surface, the third and the fourth surfaces engage and are inclined such that as the slide is moved in the one direction for moving the bolt in the first unlocking direction, the cooperating third and fourth surfaces push the push element in the opposite direction to the movement of the bolt.

11. The container with unlocking mechanism of claim 10, wherein the bolt operating portion of the slide is generally V-shaped with the apex of the V directed downward with respect to the drawer and the legs of the V being respectively inclined for defining the first downwardly facing, oblique surface on one leg of the V for engaging the bolt and defining the third upwardly facing, oblique surface on the other leg of the V for engaging the push element.

12. The container with unlocking mechanism of claim 11, wherein the end of the push element on which the fourth inclined surface thereof is defined is generally V-shaped, corresponding to the V-shape of the bolt operating portion of the slide.

13. The container with unlocking mechanism of claim 10, wherein the slide is on the exterior of the drawer and extends from the front wall of the drawer toward the rear wall of the drawer.

14. The container with unlocking mechanism of claim 13, wherein the slide is of approximately rectangular cross-section.

15. The container with unlocking mechanism of claim 10, wherein the bolt has a slide recess through which the slide travels; the slide recess has an upwardly facing bottom and the second surface of the bolt is at the bottom surface of the slide recess, such that as the slide is pushed rearwardly of the drawer and toward and through the slide recess, the movement of the slide through the slide recess of the bolt moves the bolt in the one direction away from the position abutting the housing stop.

16. The container of claim 10, wherein the first, second, third and fourth oblique surfaces are each inclined at an angle of approximately 45°.

* * * * *